(12) United States Patent
Prasad et al.

(10) Patent No.: US 6,539,719 B2
(45) Date of Patent: Apr. 1, 2003

(54) INTEGRATION OF CERAMIC OXYGEN TRANSPORT MEMBRANE COMBUSTOR WITH BOILER FURNACE

(75) Inventors: Ravi Prasad, East Amherst, NY (US); Hisashi Kobayashi, Putnam Valley, NY (US); Pauline Jane Cook, Kenmore, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/983,826

(22) Filed: Oct. 26, 2001

(65) Prior Publication Data

US 2002/0078906 A1 Jun. 27, 2002

Related U.S. Application Data

(60) Provisional application No. 60/244,904, filed on Nov. 2, 2000.

(51) Int. Cl.$^7$ .......................... F01K 25/06; B01D 53/22
(52) U.S. Cl. ............................ 60/649; 95/45; 95/54; 96/4
(58) Field of Search ........................ 60/649; 95/54, 95/43, 45; 96/4, 8, 10

(56) References Cited

U.S. PATENT DOCUMENTS

| | | | |
|---|---|---|---|
| 5,076,779 A | 12/1991 | Kobayashi | 431/5 |
| 5,643,354 A | 7/1997 | Agrawal et al. | 75/490 |
| 5,648,304 A | 7/1997 | Mazanec et al. | 501/134 |
| 5,657,624 A | 8/1997 | Kang et al. | 60/39.02 |
| 5,702,959 A | 12/1997 | Hutter et al. | 437/31 |
| 5,712,220 A | 1/1998 | Carolan et al. | 502/400 |
| 5,733,435 A | 3/1998 | Prasad et al. | 205/765 |
| 5,817,597 A | 10/1998 | Carolan et al. | 502/400 |
| 5,888,272 A | 3/1999 | Prasad et al. | 95/54 |
| 6,017,646 A | * 1/2000 | Prasad et al. | 429/13 |
| 6,139,604 A | * 10/2000 | Gottzmann et al. | 95/54 |
| 6,153,163 A | * 11/2000 | Prasad et al. | |

FOREIGN PATENT DOCUMENTS

| | | |
|---|---|---|
| EP | 747108 | 12/1996 |
| EP | 778069 | 6/1997 |
| JP | 6121717 | 1/1986 |

OTHER PUBLICATIONS

Heap et al., "Application of $NO_x$ Control Techniques to Industrial Boilers", The American Institute of Chemical Engineers, vol. 74, No. 175 (1978) pp 115–125.

* cited by examiner

Primary Examiner—Hoang Nguyen
(74) Attorney, Agent, or Firm—David M. Rosenblum

(57) ABSTRACT

An oxygen selective ion transport membrane is integrated with a boiler furnace to generate steam and, optionally, high purity oxygen and nitrogen. The heat required to drive the system is obtained by the combustion of an oxygen transported through the oxygen selective ion transport membrane with a high BTU fuel such as methane or natural gas. $NO_x$ compound formation is minimized either by utilizing a combustion products diluted air/fuel mixture for combustion in the boiler furnace or by limiting combustion to a mixture of oxygen and a fuel.

23 Claims, 6 Drawing Sheets

INTEGRATION OF CERAMIC OXYGEN TRANSPORT MEMBRANE COMBUSTOR WITH BOILER FURNACE

RELATED APPLICATIONS

This application claims benefit of Provisional Application No. 60/244,904 filed Nov. 2, 2000 which is hereby incorporated by reference as if fully set forth herein.

FIELD OF THE INVENTION

This invention relates to an integrated system that generates steam and may optionally also provide high purity streams of one or more of oxygen and nitrogen. More particularly, the integrated system combines an oxygen selective ion transport membrane with a boiler furnace. Combustion of a fuel with oxygen transported through the membrane generates heat and combustion products that are used to fire the boiler. Flue exhaust from the boiler is essentially free of $NO_x$ compounds.

BACKGROUND OF THE INVENTION

Boiler systems operate as a pressurized system in which water is vaporized to steam by heat transferred from a source of higher temperature. The steam may then be used directly as a heating medium or as a working fluid in a prime mover to convert thermal energy to mechanical work, which in turn may be converted to electrical energy. For example, expansion of the steam may be used to drive the blades of a turbine. Although other fluids are sometimes used in boilers, water is by far the most common because of its economy and suitable thermodynamic characteristics. Typically, the required heat is generated by the combustion of burning fuels.

When the fuels are burned in the presence of air, $NO_x$ compounds may be generated. These $NO_x$ compounds are deleterious from an environmental standpoint and minimizing or avoiding their formation is desired.

U.S. Pat. No. 5,076,779 to Kobayashi, that is incorporated by reference in its entirety herein, discloses a number of methods to reduce the formation of $NO_x$ in a combustor. These methods include reduction of the peak flame temperature, diluting the fuel and/or the oxygen content with a diluent and injecting separate oxidant and fuel streams into a furnace at elevated temperatures whereby the oxygen content is diluted by the furnace atmosphere to below 10%, by volume, before contacting the injected fuel.

An article by Heap et al. entitled "Application of $NO_x$ Control Techniques to Industrial Boilers" recites reducing $NO_x$ formation in a boiler by reducing the peak flame temperature, reducing the residence time of molecular nitrogen in high temperature zones and having the initial stage of heat release occur in a fuel-rich environment causing nitrogen radical intermediates to convert to $N_2$ rather than $NO_x$.

While the use of oxygen, rather than air, as the oxidant in a combustor would eliminate the formation of $NO_x$ oxygen from a cryogenic source has historically been too expensive for effective utilization in a boiler system.

Another method to generate oxygen is with an oxygen selective ion transport membrane. This membrane is a non-porous ceramic material that is capable, under proper operating temperature and oxygen partial pressure conditions, of the selective diffusion of either oxygen ions alone or a combination of oxygen ions and electrons. Air, or another oxygen-containing gas, is contacted to a first side of the ceramic material and oxygen ions are transported through the ceramic material while the other constituents of the feed gas are not. The ceramic materials are referred to as "oxygen selective" meaning that only oxygen ions are transported across the membrane with the exclusion of other elements and ions.

Suitable ceramics for use as membrane materials include mixed conductive perovskites and dual phase metal-metal oxide combinations, typified by calcium- or yttrium- stabilized zirconium or analogous oxides having a fluorite or perovskite structure. Exemplary ceramic compositions are disclosed in U.S. Pat. No. 5,702,959 (Mazanec, et al.), U.S. Pat. No. 5,712,220 (Carolan, et al.) and U.S. Pat. No. 5,733,435 (Prasad, et al.). All of the preceding patents are incorporated by reference in their entireties herein.

Use of such membranes in gas purification applications is described in European Patent Application No. 778,069 entitled "Reactive Purge for Solid Electrolyte Membrane Gas Separation" by Prasad, et al.

The ceramic membrane has the ability to transport oxygen ions and electrons at the prevailing oxygen partial pressure in a temperature range of from 450° C. to about 1200° C. when a chemical potential difference is maintained across the membrane. This chemical potential difference is established by maintaining a positive ratio of oxygen partial pressures across the ion transport membrane. The oxygen partial pressure ($P_{o2}$) is maintained at a higher value on the cathode side of the membrane, that is exposed to the oxygen-containing gas, than on the anode side, where transported oxygen is recovered. This positive $P_{o2}$ ratio may be obtained by reacting transported oxygen with an oxygen-consuming process or fuel gas. The oxygen ion conductivity of a mixed conductor perovskite ceramic membrane is typically in the range of between 0.01 and 100 S/cm where S ("Siemens") is reciprocal of ohms (1/ohms).

For effective application of a perovskite for oxygen separation, a number of requirements should be met. (1) The perovskite should have a high oxygen flux, where flux is the rate of oxygen transport through the membrane structure. (2) The perovskite must have a cubic crystalline structure over the entire range of operating temperatures. Perovskites with a hexagonal crystalline structure are not effective for oxygen transport. Some perovskites have a hexagonal crystalline structure at room temperature (nominally 20° C.) and undergo a phase transformation at an elevated temperature. In such a material, the phase transformation temperature represents the minimum temperature at which an oxygen separator containing that material as a membrane element may be operated. (3) The perovskite structure must be chemically stable at the operating temperature and (4) have a degree of mechanical stability.

A number of mixed oxide perovskites are disclosed as useful for oxygen separation. These perovskites are typically of the form $ABO_{3-x}$ where A is a lanthanide element, B is a transition metal and O is oxygen. A lanthanide, or rare earth element, is an element between atomic number 57 (lanthanum) and atomic number 71 (lutetium) in the Periodic Table of the Elements as specified by IUPAC. Typically, yttrium (atomic number 39) is included within the lanthanide group. The transition metals are those in Period 4, and between Groups II and III, of the Periodic Table of the Elements and include titanium, vanadium, chromium, manganese, iron, cobalt, nickel, copper and zinc. The A component and/or the B component may be doped with other materials to enhance stability and performance.

For stoichiometric balance, the material has three oxygen atoms. However, the oxygen transport membranes are nonstoichiometric and include vacancies at certain of the oxygen lattice points. These vacancies are represented in the formula $ABO_{3-*}$ by *, where * may be between about 0.05 and 0.5. The vacancies are mobile and move throughout the ceramic material. Oxygen ions are transported through the membrane by moving from lattice vacancy to lattice vacancy.

A paper by Sirman, "A Study of the Mass Transport and Electrochemical Properties of Materials for Ceramic Oxygen Generators" discloses that the rate of oxygen diffusivity is more dependent on the concentration of vacancies than on the vacancy mobility rate.

U.S. Pat. No. 5,648,304 by Mazanec, et al. discloses an oxygen selective perovskite represented by the formula

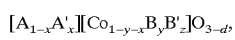

where A is selected from the group consisting of calcium, strontium and barium;

A' is selected from the lanthanide series defined as elements 57–71 on the Periodic Table of Elements as well as yttrium, thorium and uranium;

B is selected from the group consisting of iron, manganese, chromium, vanadium and titanium;

B' is selected to be copper or nickel;

x is in the range of between about 0.0001 and 0.1;

y is in the range of from about 0.002 and 0.05;

z is in the range of from about 0.0005 and 0.3; and d is determined by the valence of the metals.

Mazanec et al. disclose that the addition of a relatively low concentration of specific transition metals stabilizes the perovskite as a cubic structure inhibiting the formation of hexagonal phase materials. The crystalline structure is disclosed as stable over a temperature range of 25° C. to 950° C.

U.S. Pat. No. 5,712,220 by Carolan, et al. discloses a perovskite effective for solid state oxygen separation devices represented by the structure

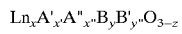

where Ln is an element selected from the f block lanthanides;

A' is selected from Group 2;

A" is selected from Groups 1, 2, and 3 and the f block lanthanides;

B, B' and B" and independently selected from the d block transition metals, excluding titanium and chromium;

$0<x<1$;

$0<x'<1$;

$0<x"<1$;

$0<y<1.1$;

$0<y'<1.1$;

$0<y"<1.1$;

$x+x'+x"=1.0$;

$1.1>y+y'+y">1.0$; and z is a number which renders the compound charge neutral where the elements are represented according to the Periodic Table of the Elements as adopted by IUPAC.

The structure disclosed by Carolan et al. has a B (transition metal) ratio $(y+y'+y"/x+x'+x")$ that is greater than 1. The structure is disclosed as having stability in an environment having high carbon dioxide and water vapor partial pressures.

U.S. Pat. No. 5,817,597 by Carolan et al. discloses a perovskite effective for solid state oxygen separation devices represented by the structure

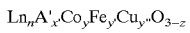

where Ln is an element selected from the f block lanthanides;

A' is either strontium or calcium;

X,y and z are greater than 0;

$X+x'=1$ $Y+y'+y"=1$;

$0<y"<0.4$; and z is a number that renders the composition of matter charge neutral.

The composition is disclosed as having a favorable balance of oxygen permeance and resistance to degradation under high oxygen partial pressure conditions. The B-site is stabilized by a combination of iron and copper.

Another perovskite structure suitable for use as an oxygen transport membrane is disclosed in Japanese Patent Office Kokai No. 61-21,717 that was published on Jan. 30, 1986. The Kokai discloses a metal oxide for oxygen transport membrane represented by the structure:

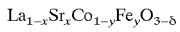

where x is between 0.1 and 1;

y is between 0.05 and 1; and

δ is between 0.5 and 0.

A paper by Teraoka (*Chemistry Letters,* a publication of the Chemical Society of Japan, 1988) discloses a perovskite structure suitable for use as an oxygen transport membrane and discusses the effect of cation substitution on the oxygen permeability. One disclosed composition is $La_{0.6}Sr_{0.4}Co_{0.8}B'_{0.2}O_3$ where B' is selected from the group consisting of manganese, iron, nickel, copper, cobalt and chromium.

In another field of endeavor, perovskites have been found to have superconductivity, the capacity to conduct electrons with virtually no electrical resistance, at temperatures approaching the boiling point of liquid nitrogen. The *Journal of Solid State Chemistry* published an article by Genouel, et al. in 1995 disclosing an oxygen deficient perovskite represented by the structure:

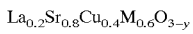

where M is selected from the group consisting of cobalt and iron; and y is between 0.3 and 0.58.

Genouel et al. disclose that the crystalline structure had a large concentration of randomly distributed oxygen vacancies, (y) was as large as 0.52 rather than the stoichiometrically predicted 0. The reference disclosed that the high electrical conductivity is related to the presence of mixed valence copper (Cu(II)/Cu(III)) and reported electrical conductivity over the range of $1000/T=3(k^{-1})$ to $1000/T=10(k^{-1})$. This temperature range, 60° C. to −173° C., is representative of the onset of superconductivity for high temperature superconductors.

It is known to integrate an oxygen selective ion transport membrane with selected industrial apparatus. For example, U.S. Pat. No. 5,657,624 to Kang discloses an integrated system for the recovery of oxygen and electric power. Compressed air is divided into two portions. A first portion is diluted with steam and combined with a fuel for combustion. The combustion products are used to drive a turbine generating power. By diluting the oxidant, it is disclosed that less $NO_x$ is formed. A second portion of the air is enriched with more compressed air and then passed through a combustor to form a hot oxygen-rich stream. The hot stream goes through an oxygen transport membrane to separate out a hot oxygen stream that is cooled in a boiler to form a cool oxygen product and a steam diluent.

U.S. Pat. No. 5,643,354 to Agrawal, et al. discloses an integrated system for iron based iron making. The system incorporates a mixture of iron oxide, coal and iron. The coal is partially combusted thereby heating the iron oxide in a reducing atmosphere to form pig iron. The oxygen is obtained from the permeate of an oxygen transport membrane that is heated by excess heat from the partial oxidation of the coal. It is disclosed that another portion of the heated combustion products can be used to fire a boiler to generate energy.

European Patent Application EP 0747108A2 discloses that an integrated system that includes an oxygen transport membrane. A high pressure permeate is used to provide oxygen to a furnace while a low pressure non-permeate is used to operate pneumatic tools.

Commonly owned U.S. Pat. No. 5,888,272 is incorporated by reference in it's entirety herein. The patent application discloses methods for integrating an oxygen transport membrane to produce the oxygen for oxygen-enriched combustion. It is also disclosed to combine the oxygen transport membrane with furnaces and in one embodiment, the oxygen transport membrane is placed inside a furnace. Heat is generated by burning oxygen on the anode side of the membrane which is purged by fuel and combustion products. A hot nitrogen stream remaining on the cathode side is used in the furnace atmosphere. Alternatively, the oxygen transport membrane may be located outside the furnace.

A method for recovering the sensible heat from a gas turbine cycle using steam boilers is taught in commonly owned U.S. patent application Ser. No. 08/871,263 (Attorney's Docket No. D-20,293) filed on Jun. 9, 1987 that is incorporated by reference in its entirety herein. The patent application discloses a method for recovering the sensible heat from a gas turbine cycle using steam boilers. Oxygen is added to hot turbine exhaust gas to increase its energy to the same level as that of partially combusted hot air (with an oxygen concentration below 20.9%, by volume). The enriched exhaust is then combusted in a conventional boiler with a low $NO_x$ production.

There remains, however, a need for an integrated system that advantageously combines the oxygen transport membrane with boiler furnaces such that the heat from the oxygen transport membrane is recovered and $NO_x$ formation is reduced.

OBJECTS OF THE INVENTION

It is an objective of the invention to provide an integrated system for producing steam with minimal $NO_x$ formation. In accordance with a first embodiment of the invention, the system includes an oxygen transport membrane cell. This oxygen transport membrane cell contains a first oxygen selective ion transport membrane that has a first cathode side and an opposing first anode side and is at a temperature effective for the transport of oxygen from the first cathode side to the first anode side. An oxygen-containing feed gas with a first portion and a second portion is provided. The first portion is caused to contact the first cathode side whereby permeate oxygen from the first portion is transported to the first anode side and a first retentate portion remains on the first cathode side. A fuel is combusted with the permeate oxygen forming combustion products and system heat.

A boiler furnace is utilized to convert a liquid to a pressurized vapor when the liquid is heated. A combustion site within the boiler supports combustion of a lean mixture of combustion products diluted air and fuel. This lean mixture includes both the combustion products and the first retentate portion.

In a preferred aspect of this first embodiment, a thermally conductive, oxygen impervious, heat exchanger is disposed within the first cathode side and the oxygen-containing feed gas is heated prior to contacting said the cathode side.

In another preferred aspect of this first embodiment, a first supplemental oxygen source provides elevated temperature oxygen to the combustion site and a heat exchanger heats the first supplemental oxygen source against flue exhaust from the combustion site.

In yet another preferred aspect of this first embodiment, the first retentate portion is cooled and purified to recover nitrogen. The first retentate portion may cooled in a convective boiler.

In a second embodiment of the invention, a second portion of the oxygen containing feed gas contacts a second oxygen transport membrane cell containing a second oxygen selective ion transport membrane that has a second cathode side and a second anode side and permeate oxygen from the second portion is transported to the second anode side and a second retentate portion from the second cathode side is provided to the combustion site.

In a preferred aspect of this second embodiment, the second retentate portion is expanded in a turbine to provide at least a portion of the energy to compress the oxygen containing feed gas and a pressure ratio between the oxygen containing feed gas and the permeate oxygen is from 7 to 15.

In another preferred aspect of this second embodiment, a combustor delivers heated and compressed oxygen containing feed gas to the first oxygen selective ion transport membrane.

In yet another preferred aspect, a vacuum is drawn on said permeate oxygen to obtain a pressure ratio between said oxygen containing feed gas and said permeate oxygen of from 8 to 12.

In a third embodiment of the invention, the integrated system cogenerates steam, nitrogen and oxygen with minimal $NO_x$ formation. This system includes a first oxygen transport membrane cell containing a first oxygen selective ion transport membrane that has a first cathode side and an opposing first anode side and is at a temperature effective for the transport of first permeate oxygen from the first cathode side to the first anode side and a second oxygen transport membrane cell containing a second oxygen selective ion transport membrane that has a second cathode side and an opposing second anode side and is at a temperature effective for the transport of second permeate oxygen from the second cathode side to the second anode side.

An oxygen-containing feed gas contacts the first cathode side whereby first permeate oxygen from the first portion is transported to the anode side and a first retentate portion remains on the first cathode side. A supplemental oxygen supply source provides preheated oxygen containing feed gas to the second cathode side whereby a second permeate portion is transported to the second anode side and a second retentate portion remains on the second cathode side.

A fuel is combusted with the first permeate portion forming combustion products and system heat. A boiler furnace that converts a liquid to a pressurized vapor when the liquid is heated includes a combustion site within the boiler for supporting combustion of a lean mixture of air and fuel. The lean mixture includes both the combustion products and the first retentate.

In a preferred aspect of this third embodiment, the oxygen containing feed gas is heated against said first retentate portion and the first retentate portion is cooled and purified to recover nitrogen.

In another preferred aspect of this third embodiment, the second permeate portion is cooled to recover oxygen.

In yet another preferred aspect of this third embodiment, the second retentate portion is expanded to produce electricity.

In a fourth embodiment of the invention an integrated system produces steam with minimal $NO_x$ formation. This system includes an oxygen transport membrane cell containing an oxygen selective ion transport membrane that has a cathode side and an opposing anode side and is at a temperature effective for the transport of oxygen from the cathode side to the anode side. An oxygen-containing feed gas contacts the cathode side whereby permeate oxygen from the first portion is transported to the anode side and a retentate portion remains on the cathode side.

A fuel is combusted with the permeate oxygen forming first combustion products and system heat. A convective boiler converts a liquid to a pressurized vapor when the liquid is heated. The convective boiler has a combustion site external to the boiler for supporting combustion of a lean mixture of air and fuel. The lean mixture includes the first combustion products and a supplemental source of oxygen and generates second combustion products and heat.

In a preferred aspect of this fourth embodiment, the retentate is combined with the second combustion products prior to delivery to said boiler and a supplemental fuel source provides additional fuel to the combustion site.

SUMMARY OF THE INVENTION

At least one oxygen selective ion transport membrane is integrated with a boiler to generate steam and, optionally, high purity oxygen and nitrogen. The heat required to drive the system is obtained by the combustion of a oxygen transported through the oxygen selective ion transport membrane with a high BTU fuel such as methane or natural gas. $NO_x$ compound formation is minimized either by utilizing a lean air/fuel mixture for combustion in the boiler furnace or by limiting combustion to a mixture of oxygen and a fuel. The system is particularly suited for either a convective boiler or a boiler furnace.

BRIEF DESCRIPTION OF THE DRAWINGS

Other objects, features and advantages will occur to those skilled in the art from the following description of preferred embodiments and accompanying drawings in which.

DETAILED DESCRIPTION

Figure 1:
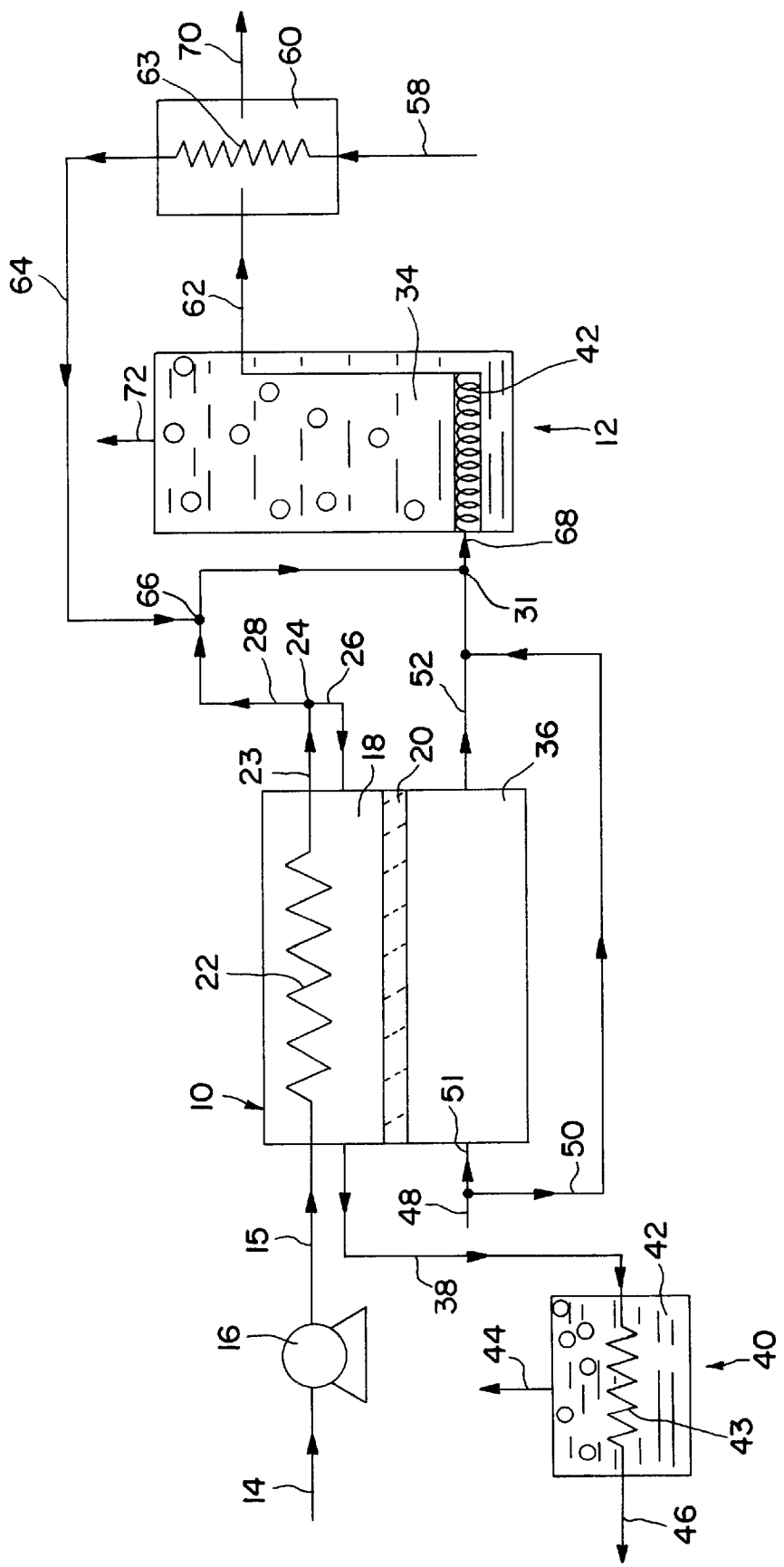
FIG. 1 schematically illustrates a system integrating an oxygen transport membrane and a boiler for the cogeneration of nitrogen and steam.

FIG. 1 schematically illustrates an integrated system for producing steam 72 with a minimal formation of $NO_x$ compounds. These $NO_x$ compounds would typically be contained in boiler furnace 12 flue exhaust 62.

The system includes a first oxygen transport membrane cell 10 and a boiler furnace 12. An oxygen containing feed gas 14, that is typically air, is compressed in a suitable compressor 16 to an operating pressure of between 17 psia and 40 psia. Compressed feed gas 15 is transported through a first cathode side 18 of the first oxygen transport membrane cell 10 without contacting the oxygen selective ion transport membrane 20. This is achieved by transporting the compressed feed gas 15 through a thermally conductive, oxygen impervious, heat exchanger 22 that is typically formed from copper or steel. The first cathode side 18 is typically at a temperature of between 800° C. and 1000° C. and transit of the compressed feed gas through the heat exchanger 22 raises the temperature of the compressed feed gas 15 to within about 50 to 200° C. of the cathode side temperature. The heated and compressed feed gas 23 is divided 24 into a first portion 26 and a second portion 28. The second portion 28 is combined 31 with combustion products 52 and, optionally, a portion 50 of fuel 48 to support lean combustion in the boiler furnace.

First portion 26 of heated and compressed feed gas 23 is returned to the cathode side 18 and contacts the oxygen selective ion transport membrane 20. A portion, referred to as permeate oxygen, of the oxygen contained within the heated and compressed feed gas is transported through the oxygen selective ion transport membrane to the first anode side 36.

The oxygen selective ion transport membrane 20 is typically formed from an inorganic oxide, typified by calcium— or yttrium—stabilized zirconia or analogous oxides having a fluorite or perovskite structure. The oxygen selective ion transport membranes 10 have a nominal thickness of under 5000 microns and are preferably less than 1000 microns thick. The membrane element has the ability to transport oxygen ions and electrons at the prevailing oxygen partial pressure in the temperature range of from 450° C. to about 1200° C. when a chemical potential difference is maintained across the ion transport membrane surface caused by maintaining a positive ratio of oxygen partial pressures across the ion transport membrane. This positive ratio is preferably achieved by reacting transported oxygen with an oxygen-consuming process gas. The oxygen ion conductivity is typically in the range of between 0.01 and 100 S/CM where S is reciprocal ohms (1/ohms).

Suitable materials for the ion transport membrane include perovskites and dual phase metal-metal oxide combinations as listed in Table 1. Since the reactive environment on the anode side of the oxygen selective ion transport membrane, in many applications, creates very low partial oxygen pressures, the chromium-containing perovskites listed in Table 1 may be preferred materials since these tend to be stable in the low partial oxygen pressure environment. The chromium-containing perovskites are not typically decomposed at very low partial oxygen pressures.

Optionally, a porous catalyst layer, possibly made from the same perovskite material, may be added to one or both sides of the oxygen-transport membrane element to enhance oxygen surface exchange and the chemical reactions on the surfaces. Alternatively, the surface layers of the oxygen selective ion transport membrane element may be doped, for example, with cobalt, to enhance surface exchange kinetics.

EXAMPLES OF MIXED CONDUCTING SOLID ELECTROLYTES

Material composition

1. $(La_{1-x}Sr_x)(Co_{1-y}Fe_y)O_{3-\delta}$ ($0 \leq x \leq 1$, $0 \leq y \leq 1$, $\delta$ from stoichiometry)
2. $SrMnO_{3-\delta}$
   $SrMn_{1-x}Co_xO_{3-\delta}$ ($0 \leq x \leq 1$, $\delta$ from stoichiometry)
   $Sr_{1-x}Na_xMnO_{3-\delta}$
3. $BaFe_{0.5}Co_{0.5}YO_3$
   $SrCeO_3$
   $YBa_2Cu_3O_{7-\delta}$ ($0 \leq \delta \leq 1$, $\delta$ from stoichiometry)
4. $La_{0.2}Ba_{0.8}Co_{0.8}Fe_{0.2}O_{2.6}$; $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ ($x$, $x'$, $x''$, $y$, $y'$, $y''$ and $z$ all in 0–1 range) where: A, A', A" = from groups 1, 2, 3 and f-block lanthanides B, B', B" = from d-block transition metals
6. (a) Co-La-Bi type:    Cobalt oxide   15–75   mole %
   Lanthanum oxide   13–45   mole %
   Bismuth oxide   17–50   mole %
   (b) Co-Sr-Ce type:    Cobalt oxide   15–40   mole %
   Strontium oxide   40–55   mole %
   Cerium oxide   15–40   mole %
   (c) Co-Sr-Bi type:    Cobalt oxide   10–40   mole %
   Strontium oxide   5–50   mole %
   Bismuth oxide   35–70   mole %
   (d) Co-La-Ce type:    Cobalt oxide   10–40   mole %
   Lanthanum oxide   10–40   mole %
   Cerium oxide   30–70   mole %
   (e) Co-La-Sr-Bi type:    Cobalt oxide   15–70   mole %
   Lanthanum oxide   1–40   mole %
   Strontium oxide   1–40   mole %
   Bismuth oxide   25–50   mole %
   (f) Co-La-Sr-Ce type:    Cobalt oxide   10–40   mole %
   Lanthanum oxide   1–35   mole %
   Strontium oxide   1–35   mole %
   Cerium oxide   30–70   mole %
7. $Bi_{2-x-y}M'_xM_yO_{3-\delta}$ ($0 \leq x \leq 1$, $0 \leq y \leq 1$, $\delta$ from stoichiometry) where: M' = Er, Y, Tm, Yb, Tb, Lu, Nd, Sm, Dy, Sr, Hf, Th, Ta, Nb, Pb, Sn, In, Ca, Sr, La and mixtures thereof M = Mn Fe, Co, Ni, Cu and mixtures thereof
8. $BaCe_{1-x}Gd_xO_{3-x/2}$ where, x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;
   B' represents Cr or Ti, or a mixture thereof;
   B" represents Mn, Co, V, Ni or Cu, or a mixture thereof;
   and s, t, u, v, w, and x are numbers such that:
   s/t equals from about 0.01 to about 100;
   u equals from about 0.01 to about 1;
   v equals from zero to about 1;
   w equals from zero to about 1;
   x equals a number that satisfies the valences of the A, A', B, B', B" in the formula; and $0.9 < (s + t)/(u + v + w) < 1.1$
10. One of the materials of $Ce_{1-x}A_xO_{2-\delta}$ family, where:
    A represents a lanthanide, Ru, or Y; or a mixture thereof;
    x equals from zero to about 1;
    y equals from zero to about 1;
    $\delta$ equals a number that satisfies the valences of Ce and A in the formula.
11. One of the materials of $Sr_{1-x}Bi_xFeO_{3-\delta}$ family, where:
    A represents a lanthanide or Y, or a mixture thereof;
    x equals from zero to about 1;
    y equals from zero to about 1;
    $\delta$ equals a number that satisfies the valences of Ce and A in the formula.
12. One of the materials of $Sr_xFe_yCo_zO_w$ family, where:
    x equals from zero to about 1;
    y equals from zero to about 1;

-continued

EXAMPLES OF MIXED CONDUCTING SOLID ELECTROLYTES

Material composition z equals from zero to about 1;
    w equals a number that satisfies the valences of Sr, Fe and Co in the formula.
13. Dual phase mixed conductors (electronic/ionic):
    $(Pd)_{0.5}/(YSZ)_{0.5}$
    $(Pt)_{0.5}/(YSZ)_{0.5}$
    $(B-MgLaCrO_x)_{0.5}(YSZ)_{0.5}$
    $(In_{90\%}Pt_{10\%})_{0.6}/(YSZ)_{0.5}$
    $(In_{90\%}Pt_{10\%})_{0.5}/(YSZ)_{0.5}$
    $(In_{95\%}Pr_{2.5\%}Zr_{2.5\%})_{0.5}/(YSZ)_{0.5}$
    Any of the materials described in 1–13, to which a high temperature metallic phase (e.g., Pd, Pt, Ag, Au, Ti, Ta, W) is added.
14. One of the materials of $A_{2-x}A'_xB_{2-y}B'_yO_{5+z}$ family whose composition is disclosed in WO 97/41060 (Schwartz et al.) as follows:
    A represents an alkaline earth metal or a mixture thereof;
    A' represents a lanthanide or Y, or a mixture thereof;
    B represents a metal ion or mixtures of 3d transition metal ions and group 13 metals;
    B' represents a metal ion or mixtures of 3d transition metal ions and group 13 metals, the lanthanides and yttrium;
    $0 < x < 2$; $0 < y < 2$; z renders the compound charge neutral
15. One of the materials of $Ln_xA'_xCo_yFe_yCu_{y''}O_{3-z}$ family whose composition is disclosed in EP 0 732 30.5 A1 (Dyer et al.) as follows:
    Ln represents a f block lanthanide;
    A' represents Sr or Ca;
    $x > 0$, $y > 0$, $x + x' = 1$, $y + y' + y'' = 1$, $0 < y \leq 0.4$
    z renders the compound charge neutral
16. One of the materials of $Ln_xA'_xA''_{x''}B_yB'_{y'}B''_{y''}O_{3-z}$ family whose composition is disclosed in EP 0 931 763 A1 (Dyer et al.) as follows:
    Ln represents a f block lanthanide;
    A' from groups 2;
    A" from groups 1, 2, 3 and f-block lanthanides
    B, B' from d-block transition metals excluding Ti and Cr
    $0 \leq x < 1$, $0 < x' \leq 1$, $0 < y < 1.1$, $0 \leq y' < 1.1$, $x + x' + x'' = 1.0$, $1.1 > y + y' > 1.0$, z renders the compound charge neutral If the oxygen selective ion transport membrane 20 is of the type referred to as a mixed conductor, both oxygen ions and electrons are transported through the membrane. Otherwise, electrically conductive pads are affixed to a first cathode side 18 surface and a first anode side 36 surface and electrons recovered as electric current.

Oxygen-depleted feed gas 38, referred to as first retentate portion, is withdrawn from the first cathode side 18. The oxygen-depleted feed gas 38 typically has an oxygen content of between 2% and 10%, by volume, and a temperature of between 800° C. and 1000° C. The oxygen-depleted feed gas is delivered to a convective boiler 40 where water 42 is converted to steam 44 that is removed for use as heat or as a mechanical energy source. The flue exhaust 46 from the convective boiler 40 is a cooled stream of oxygen-depleted, nitrogen-rich gas.

Additional purification of the convective boiler 40 flue exhaust 46 removes residual oxygen, such as by catalytic deoxination or a reactively purged OTM Deoxo system such as by to generate a high purity, high pressure, nitrogen stream having a nitrogen content in excess of 99%, by volume.

While the invention is applicable to many different types of boilers, convective boilers and boiler furnaces are particularly suitable. As illustrated in FIG. 1, in a convective boiler 40, heat generated external to the boiler is conducted to a fluid 42 contained within the convective boiler, such as by heat exchanger 43. In a boiler furnace 12, combustion 45 generates heat internally in the boiler.

A high BTU fuel 48, that is typically methane, natural gas or another hydrocarbon gas, is delivered to the first anode side 36 of the first oxygen transport membrane cell 10. Optionally, a portion 50 of the fuel 48 is diverted around the oxygen transport membrane cell 10. A portion 51 of the fuel 48 delivered to the first anode side 36 is combusted with the permeate oxygen. Combustion generates both sufficient system heat to maintain the oxygen selective ion transport membrane 20 at an operating temperature of between 800° C. and 1100° C. and elevated temperature combustion products 52. The combustion products 52 comprise carbon dioxide and steam as well as uncombusted fuel and are at a temperature of between about 800° C. and 1000° C.

The combustion products 52, and optionally diverted portion 50 of fuel 48, are combined 31 with the heated second portion 28. Optionally, a first supplemental oxygen-containing feed gas 58 is heated in an air pre-heater 60 against heated flue exhaust 62 from boiler furnace 12. By "heated against" it is meant that a higher temperature fluid (liquid or gas) interacts with a lower temperature fluid (liquid or gas) in an environment in which heat is exchanged from the higher temperature fluid to the lower temperature fluid without mixing of the fluids. For example, one of the fluids may be contained within a thermally conductive, fluid impervious heat exchanger and the other fluid caused to contact exterior surfaces of that heat exchanger.

Heated first supplemental oxygen-containing feed gas 64 is combined 66 with the second portion 28. Boiler furnace 12 input 68 is diluted by excess nitrogen and combustion products and therefore has a low oxygen concentration but an oxygen/fuel ratio above stoichiometric. By volume, the oxygen concentration is less than 10% and more than 3%. The mixture does not combust when the input 68 is not pre-heated. Using a preheated mixture, with heat generated by combustion in the oxygen transport membrane cell 10 transferred by heat exchangers 22, 63 to the oxygen containing feed gases constituents, facilitates ultra-lean combustion in boiler furnace 12 greatly reducing $NO_x$ from system output 70. The ultra-lean combustion in boiler furnace 12 generates steam 72 to provide either heat energy or a working fluid to generate mechanical energy.

Figure 2:
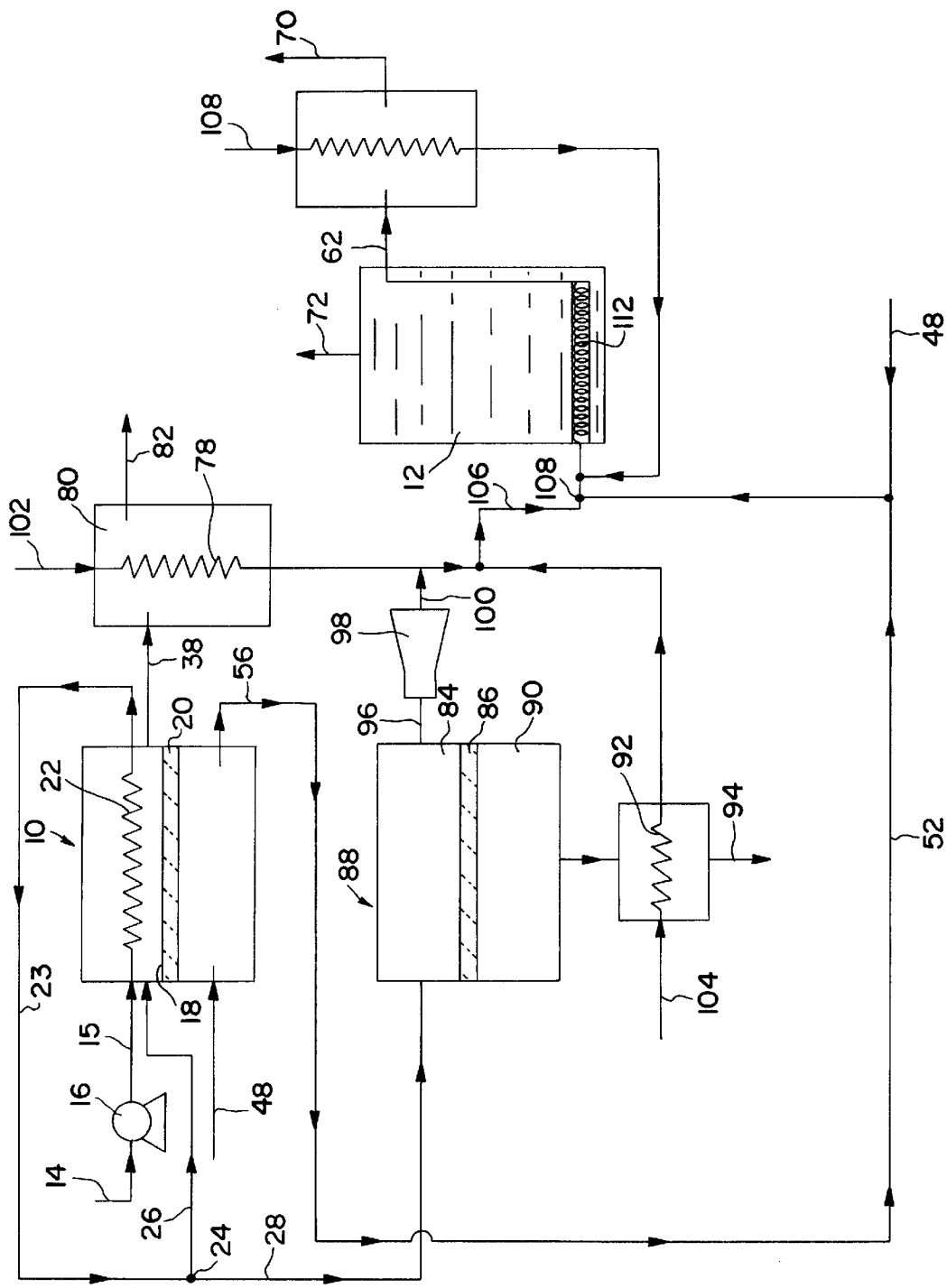
FIG. 2 schematically illustrates a system integrating an oxygen transport membrane and a boiler for the cogeneration of nitrogen, oxygen and steam.

FIG. 2 schematically illustrates a system that integrates multiple oxygen transport membrane cells with a boiler furnace for the co-generation of nitrogen, oxygen and steam. A number of the elements of this system are common with those of FIG. 1 and like figure numerals are employed.

An oxygen-containing feed gas 14 is compressed in compressor 16 and delivered to a first oxygen transport membrane cell 10 having a first oxygen selective ion transport membrane 20. The compressed feed gas 15 is transported through thermally conductive, oxygen-impervious, heat exchanger 22. The first oxygen transport membrane cell 10 is at a temperature effective for oxygen transport through the first oxygen selective ion transport membrane 20, typically between about 800° C. and about 1100° C. While traversing the heat exchanger 22, the compressed feed gas 15 is heated to a temperature of about 700 to 1000° C. The heated and compressed oxygen-containing feed gas 23 is divided 24 into a first portion 26 and a second portion 28. The first portion 26 is returned to the first cathode side 18 of the first oxygen selective ion transport membrane 20. A portion of the oxygen contained within first portion 26 is transported through the first oxygen selective ion transport membrane 20 and combusted with a high BTU fuel 48, such as methane or natural gas. Oxygen depleted feed gas 38 is cooled against a recovery heat exchanger 78 of a first oxygen pre-heat unit 80. A cooled nitrogen-rich product gas 82 is recovered. Additional purification may be employed to remove residual oxygen, argon and water vapor.

The second portion 28 of the heated and compressed feed gas 23 is transported to a second cathode side 84 of a second oxygen selective ion transport membrane 86 contained within a second oxygen transport membrane cell 88. A portion of the oxygen contained within the second portion 28 is transported to the second anode side 90 and cooled against a recovery heat exchanger 92 and recovered as a low pressure stream of high purity oxygen product gas 94.

An oxygen depleted second retentate portion 96 is expanded in a turbine 98 to produce at least some of the energy utilized to drive compressor 16. The expanded oxygen depleted portion 100 is combined with additional heated oxygen for delivery to boiler furnace 12.

The additional oxygen is at an elevated temperature and is typically air. A first supplemental oxygen source 102 is heated by recovery heat exchangers 78 while a second supplemental oxygen source is heated by recovery heat exchanger 92.

Boiler furnace 12 input 106, comprising air from the first 102 and second 104 supplemental oxygen sources as well as expanded oxygen-depleted portion 100, is combined 108 with a mixture of combustion products 52 and fuel 48.

In addition, a third supplemental oxygen source 108, again typically air, is heated by recovery heat exchanger 110 against the flue exhaust 62 of the lean combustion 112 that occurs within the boiler furnace 12 generating steam 72.

The desired operating temperatures for both the first 20 and second 86 oxygen selective membranes are in excess of 450° C. and preferably in the range of from about 800° C. to about 1000° C. The preferred pressure ratio (feed pressure as measured at compressor 16/product pressure as measured at high purity oxygen stream 94) is in the range from about 8 to about 10. Supplemental oxygen sources 102, 104 and 108 are selected to have sufficient oxygen to support lean combustion. Preferably, the supplemental oxygen sources contain at least 12%, by volume, of oxygen and is most preferably air.

Figure 3:
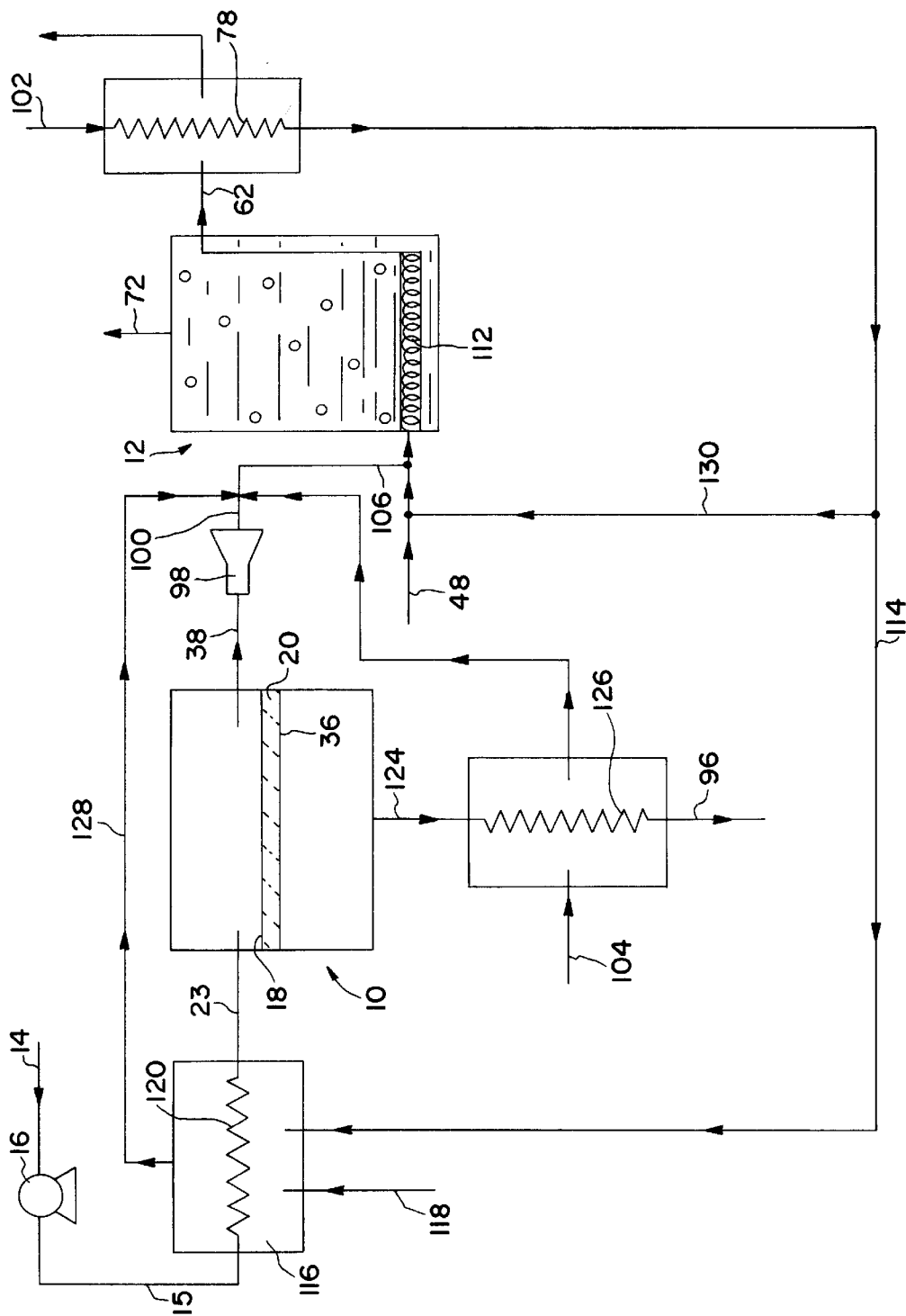
FIG. 3 schematically illustrates a system integrating an oxygen transport membrane and a boiler for the cogeneration of oxygen and steam.

FIG. 3 schematically illustrates an integrated system having an oxygen transport membrane 10 and a boiler furnace 12 for the cogeneration of oxygen 96 and steam 72. A first supplemental oxygen source 102, typically air, is heated in recuperative heat exchanger 78 against the heat retained in flue exhaust 62. A first portion 114 of supplemental oxygen source 102 is transported to a fired preheater 116, combined with a high BTU fuel 118, and combusted. The heat from combustion is transferred by means of recuperative heat exchanger 120 to compressed oxygen-containing feed gas 15. Heated and compressed feed gas 23 is transported to the first oxygen transport membrane cell 10. The heated and compressed feed gas 23 contacts the first cathode side 18 of the first oxygen selective ion transport membrane 20 and a portion of the oxygen contained therein is transported to the first anode side 36. A heated stream of oxygen 124 is cooled against recuperative heat exchanger 126 and oxygen product gas 96 recovered.

The sensible heat of the heated stream of oxygen 124 is transferred to a second supplemental oxygen source 104, that is typically air. The heated second supplemental oxygen source 104 is combined with combustion products 128 and expanded portion 100 of oxygen depleted feed gas 38 and the combination forms a lean air fuel mixture 106 for delivery to furnace boiler 112.

The oxygen-depleted feed gas 38 is expanded in turbine 98 generating at least some of the power required for compressor 16.

Boiler furnace 12 may receive additional fuel 48 and additional air may be provided by a second portion 130 of the first supplemental oxygen source 102. Lean combustion 112 in the boiler furnace 12 generates heated flue exhaust 62 utilized to heat the first supplemental oxygen source 102. The boiler furnace further generates steam 72 that may be used as heat source or a working fluid to generate mechanical energy.

Figure 4:
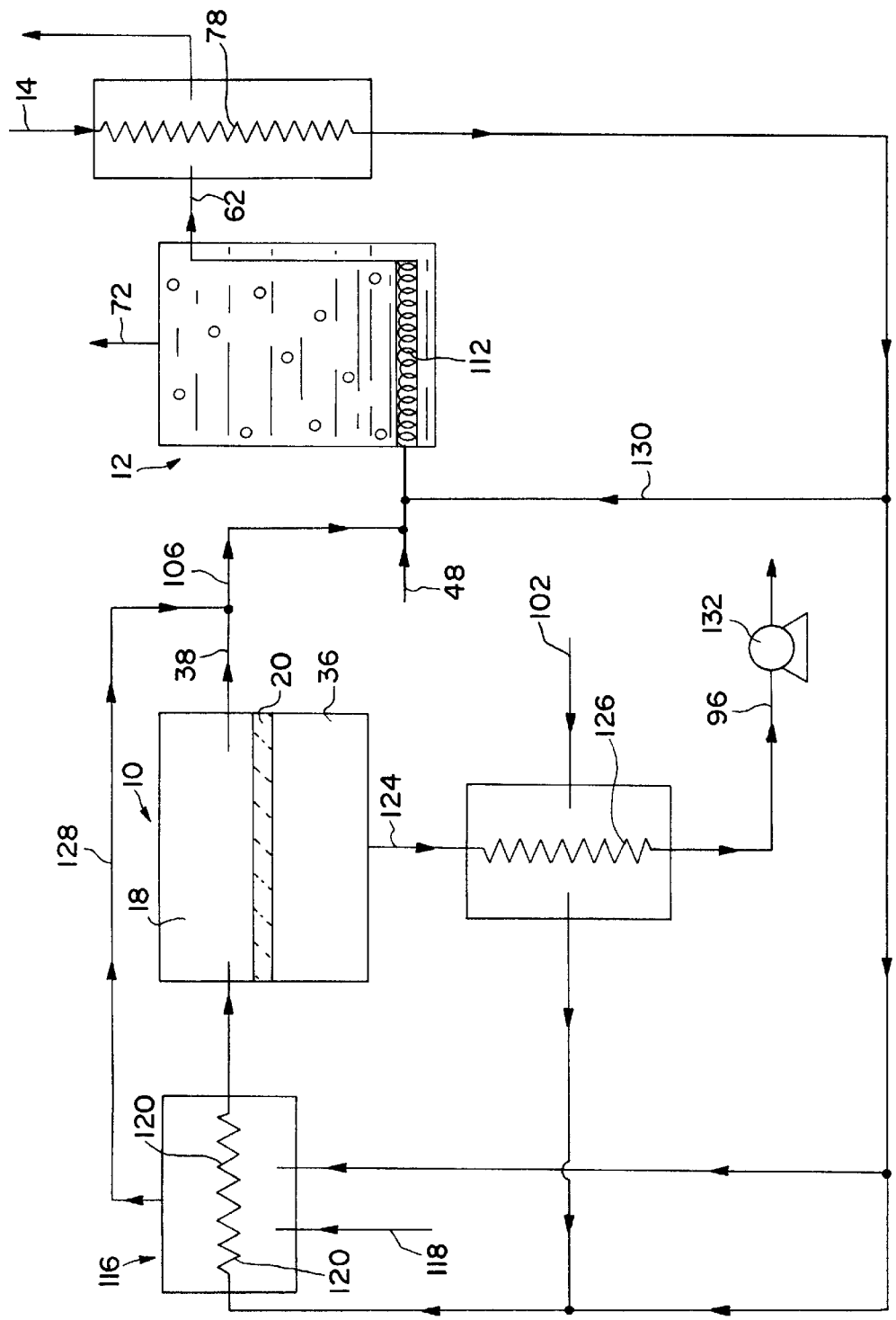
FIG. 4 schematically illustrates an alternative system integrating an oxygen transport membrane and a boiler for the cogeneration of oxygen and steam.

Alternatively, the driving pressure for the system may be a vacuum pump drawing a vacuum on the oxygen product stream 96 rather than compression of incoming feed gas. Similar to preceding embodiments, the pressure ratio across the oxygen transport membrane is on the order of 8 to 10. This integrated system is illustrated in FIG. 4. Elements in FIG. 4 that similar to elements in FIG. 3 and serving like function are identified by like reference numerals and the description of these elements is incorporated from the description above.

In this embodiment, the oxygen-containing feed gas 14 is preheated through the use of one or more recuperative heat exchangers 78, 120 and delivered to the first cathode side 18 of first oxygen selective ion transport membrane 20. The oxygen-containing feed gas 14 is at a temperature of between 800° C. and 1000° C. and is essentially at atmospheric pressure. A vacuum pump 132 reduces the pressure on the first anode side 36 to the range of about 1 psia to about 2.5 psia thereby providing the driving force for oxygen transport through the first oxygen selective ion transport membrane 20.

First supplemental oxygen source 102 is preheated by recuperative heat exchanger 126 that recovers the heat from the heated stream of permeate oxygen 124 exiting the first anode side 36.

Figure 5:
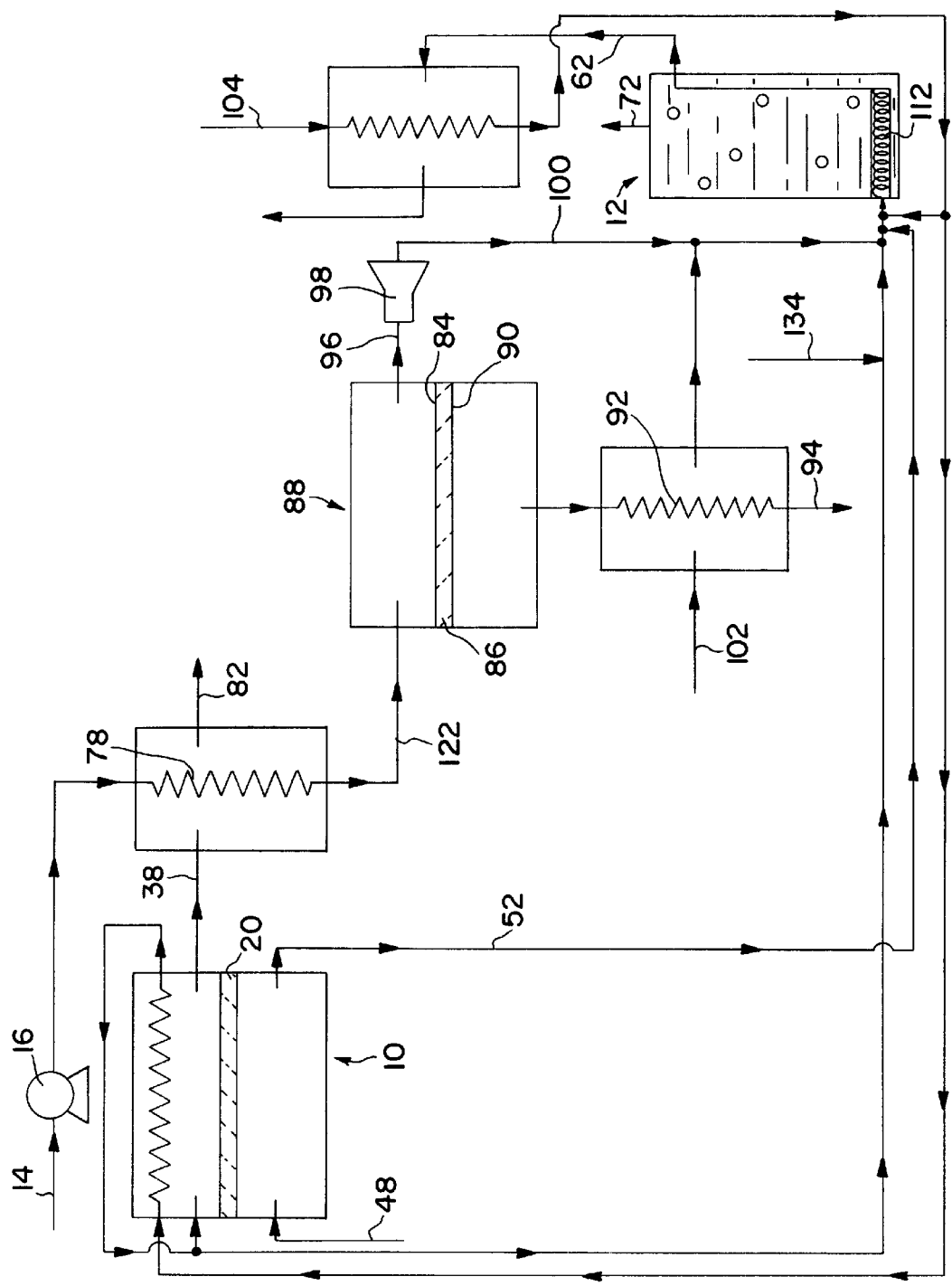
FIG. 5 schematically illustrates an alternative system for the cogeneration of nitrogen, oxygen and steam.

FIG. 5 schematically illustrates an integrated system for the cogeneration of low pressure nitrogen, low pressure oxygen and steam with little or no $NO_x$ formation. Oxygen-containing feed gas 14 is compressed 16 and heated by recuperative heat exchanger 78. The heat is obtained from oxygen-depleted output 38 exiting a first oxygen transport membrane cell 10 that functions as a combustor to provide the system heat. First permeate oxygen transported through the first oxygen selective ion transport membrane 20 generates system heat and combustion products 52. A portion of the system heat is transported with the oxygen-depleted feed gas 38 and cooled against recuperative heat exchanger 78 generating a low temperature, nitrogen-rich product gas 82. Further processing may be utilized to remove residual oxygen, argon and water vapor from the product stream 82.

Heated and compressed oxygen containing feed gas 122 is transported to a second oxygen transport membrane cell 88 containing a second oxygen selective ion transport membrane 86. Second permeate oxygen is transported from the second cathode side 84 to the second anode side 90 and cooled against recuperative heat exchanger 92 by heating first supplemental oxygen source, typically air, 102. A cooled high purity oxygen stream 94 is obtained as a product gas.

Oxygen depleted second retentate portion 96 is expanded in turbine 98 generating at least a portion of the power necessary to operate compressor 16. The expanded oxygen-depleted portion 100 is combined with the first supplemental oxygen source 102, combustion products 52, a second supplemental oxygen source 104, and supplemental fuel 134 to support lean combustion 112 in boiler furnace 12 to generate steam 72 as a product as well as flue exhaust 62 that may be utilized to heat the second supplemental oxygen source 104.

Figure 6:
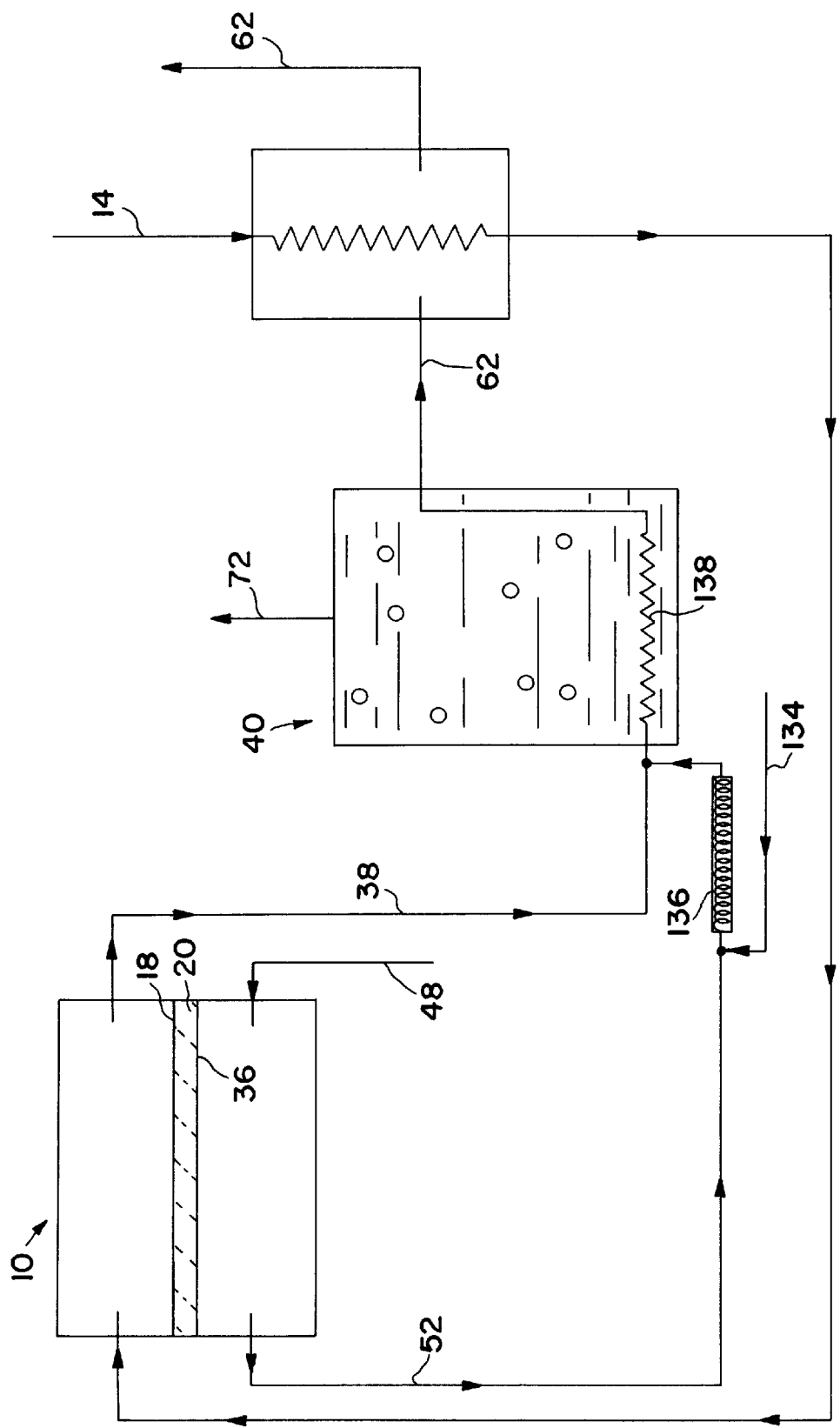
FIG. 6 schematically illustrates a system integrating an oxygen transport membrane and a boiler for the generation of steam with very low $NO_x$ production.

FIG. 6 schematically illustrates integration of an oxygen-transport membrane cell 10 and a convective boiler 40 in which the oxygen transport membrane cell functions as a burner for the convective boiler for low $NO_x$ operation of the boiler. Oxygen containing feed gas 14 is heated against flue exhaust 62 and transported to the cathode side 18 of an oxygen selective ion transport membrane 20. A permeate portion of the oxygen contained within the oxygen containing feed gas is transported to the anode side 36 and combusted with a high BTU fuel 48. This combustion generates the system heat. Combustion products 52 and any excess permeate oxygen and are combined with supplemental fuel 134 in combustor 136 external to convective boiler 40. Since combustor 136 only contains fuel, combustion products and oxygen, combustion generates second combustion products and heat, but not $NO_x$. While oxygen depleted feed gas 38 contains nitrogen, there is no combustion within convective boiler 40 and the temperature of heat exchanger 138 is on the order of from about 800° C. to 1000° C., sufficiently low to limit or prevent the formation of $NO_x$ compounds. Therefore, flue exhaust 62 is substantially free of $NO_x$.

While the invention has been described most particularly with oxygen selective ion transport membranes that conduct both oxygen ions and electrons, where the required driving force to transport the ions is provided by a lower oxygen partial pressure at the anode side of the membrane, it is possible to utilize materials that conduct oxygen ions only. In that event, electrodes and an external circuit are required for the transport of electrons.

It should be recognized that the fuel containing purge streams and the feed streams may have flow configurations that are either cocurrent or countercurrent in each embodiment of the invention.

Throughout this application, low pressure product streams are defined as product streams having a pressure of less than 20 psia while high pressure product streams have a pressure in excess of 30 psia. A high BTU fuel has an heating value in excess of 500 BTU/NCFH.

We claim:

1. An integrated system for producing steam with minimal $No_x$ formation, comprising:
    an oxygen transport membrane cell containing a first oxygen selective ion transport membrane that has a first cathode side and an opposing first anode side and is at a temperature effective for the transport of oxygen from said first cathode side to said first anode side;
    a boiler furnace including a combustion site within said boiler for supporting combustion of a diluted mixture of oxygen and fuel to raise steam;
    a conduit extending from said oxygen transport membrane cell to said combustion site for transport of at least one component of said lean mixture of oxygen and fuel; and
    a convective boiler connected to said first cathode side of said oxygen transport membrane cell to receive an oxygen-depleted feed gas and thereby generate further steam.

2. The integrated system of claim 1 wherein an oxygen-containing feed gas has a first portion and a second portion, said first portion contacting said first cathode side whereby permeate oxygen from said first portion is transported to said first anode side and a retentate first portion remains on said first cathode side, thereby forming said oxygen-depleted feed gas.

3. The integrated system of claim 2 wherein fuel is combusted with said permeate oxygen forming combustion products and system heat.

4. The integrated system of claim 3 wherein a first supplemental oxygen source provides elevated temperature oxygen to said combustion site.

5. The integrated system of claim 4 wherein a heat exchanger heats said first supplemental oxygen source against flue exhaust from said combustion site.

6. The integrated system of claim 3 wherein said second portion of said oxygen containing feed gas is provided to said combustion site.

7. The integrated system of claim 3 wherein said first retentate portion is cooled and purified to recover nitrogen.

8. An integrated system for producing steam with minimal $NO_x$ formation, comprising:
- an oxygen transport membrane cell containing a first oxygen selective ion transport membrane that has a first cathode side contacted by a first portion of an oxygen containing feed and an opposing first anode side and is at a temperature effective for the transport of oxygen from said first cathode side to said first anode side so that permeate oxygen from said first portion is transported from said first cathode side to said first anode side and a retentate first portion remains on said first cathode side;
- a boiler furnace including a combustion site within said boiler for supporting combustion of a diluted mixture of oxygen and fuel to raise steam;
- fuel is combusted with said permeate oxygen forming combustion products and system heat; and
- a second oxygen transport membrane cell containing a second oxygen selective ion transport membrane that has a second cathode side contacted with a second portion of said oxygen containing feed and a second anode side and is at a temperature effective for the transport of oxygen from said second cathode side to said second anode side further permeate oxygen from said second portion is transported to said second anode side and a second retentate portion is produced on said second cathode side;
- the second oxygen transport membrane cell connected to said combustion site such that said second retentate portion is provided to said combustion site to form part of said diluted mixture of oxygen and fuel.

9. The integrated system of claim 8 wherein said retentate from said second cathode side is expanded in a turbine prior to being provided to said combustion site.

10. The integrated system of claim 9 wherein said turbine is electrically coupled to a compressor for compressing said oxygen containing feed gas.

11. The integrated system of claim 10 wherein a pressure differential between said oxygen containing feed gas and said permeate oxygen from said second portion is from 8 to 10.

12. The integrated system of claim 10 wherein a supplemental oxygen source is heated against one or more of said retentate of said first portion, said retentate of said second portion and said flue exhaust.

13. The integrated system of claim 1 wherein a vacuum is drawn against said permeate oxygen.

14. The integrated system of claim 13 wherein the pressure ratio between said oxygen containing feed gas and permeate oxygen is from 8 to 12.

15. An integrated system for cogenerating steam, nitrogen and oxygen with minimal $NO_x$ formation, comprising:
- a first oxygen transport membrane cell containing a first oxygen selective ion transport membrane that has a first cathode side and an opposing first anode side and is at a temperature effective for the transport of first permeate oxygen from said first cathode side to said first anode side;
- a second oxygen transport membrane cell containing a second oxygen selective ion transport membrane that has a second cathode side and an opposing second anode side and is at a temperature effective for the transport of second permeate oxygen from said second cathode side to said second anode side;
- an oxygen-containing feed gas contacting said first cathode side whereby first permeate oxygen from said first portion is transported to said anode side and a first retentate portion remains on said first cathode side;
- a supplemental oxygen supply source providing preheated oxygen containing feed gas to said second cathode side whereby a second permeate portion is transported to said second anode side and a second retentate portion remains on said second cathode side;
- a fuel combusted with said first permeate portion forming combustion products and system heat;
- a boiler furnace for converting a liquid to a pressurized vapor when said liquid is heated; and
- a combustion site within said boiler for supporting combustion of a lean mixture of air and fuel, said lean mixture including both said combustion products and said first retentate.

16. The integrated system of claim 15 wherein a thermally conductive, oxygen impervious heat exchanger is disposed within said cathode side and said oxygen-containing feed gas is heated prior to contacting said cathode side.

17. The integrated system of claim 16 wherein said oxygen containing feed gas is heated against said first retentate portion.

18. The integrated system of claim 17 wherein a heat exchanger heats said first supplemental oxygen source against flue exhaust from said combustion site.

19. The integrated system of claim 18 wherein said first retentate portion is cooled and purified to recover nitrogen.

20. The integrated system of claim 18 wherein said second permeate portion is cooled to recover oxygen.

21. The integrated system of claim 18 wherein said second retentate portion is expanded to produce electricity.

22. An integrated system for producing steam with minimal $NO_x$ formation, comprising:
- an oxygen transport membrane cell containing a first oxygen selective ion transport membrane that has a first cathode side and an opposing first anode side and is at a temperature effective for the transport of oxygen from said first cathode side to said first anode side from an oxygen containing feed, thereby forming an oxygen depleted feed on said first cathode side;
- a convective boiler;
- a combustion site external said convective boiler for supporting combustion of a lean mixture of oxygen and fuel;
- a conduit extending from said first anode side of said oxygen transport membrane cell to said combustion site for transport of at least one component of said lean mixture of oxygen and fuel; and
- a heat exchanger located within the convective boiler;
- the heat exchanger connected to said first cathode side and said combustion site to receive said oxygen depleted feed and combustion products of said combustion site, respectively, thereby to heat water within said convective boiler.

23. The integrated system of claim 22 wherein fuel is combusted with part of said oxygen transported from said first cathode side to said first anode side forming combustion products and system heat.

* * * * *